United States Patent
Szumer et al.

(10) Patent No.: US 7,290,346 B2
(45) Date of Patent: Nov. 6, 2007

(54) EXTENSION SET FOR SPIRIT LEVELS

(75) Inventors: Emanuel Szumer, Buderim (AU);
Stephen Sweet, Cedar Park, TX (US);
Mordechai Schwartz, Shimshit (IL)

(73) Assignee: Kapro Industries, Ltd, Hakarem (IL)

( * ) Notice: Subject to any disclaimer, the term of this patent is extended or adjusted under 35 U.S.C. 154(b) by 0 days.

(21) Appl. No.: 11/349,924

(22) Filed: Feb. 9, 2006

(65) Prior Publication Data
US 2006/0123644 A1   Jun. 15, 2006

Related U.S. Application Data

(63) Continuation-in-part of application No. PCT/IL2003/000685, filed on Aug. 18, 2003.

(60) Provisional application No. 60/750,069, filed on Dec. 14, 2005.

(51) Int. Cl.
*G01C 9/28*   (2006.01)
(52) U.S. Cl. .................................................. 33/374
(58) Field of Classification Search ................ 33/374, 33/379, 383, 384, 385, 387, 388, 375, 376
See application file for complete search history.

(56) References Cited

U.S. PATENT DOCUMENTS

| | | | |
|---|---|---|---|
| 1,844,762 A * | 2/1932 | Hilton | ........................... 33/374 |
| 3,648,378 A * | 3/1972 | Thingstad et al. | ............. 33/374 |
| 4,035,923 A * | 7/1977 | Florczak | ...................... 33/374 |
| 4,130,943 A | 12/1978 | Talbot | |
| 4,894,925 A | 1/1990 | Langmaid | |
| 4,928,395 A | 5/1990 | Good | |
| 5,249,365 A | 10/1993 | Santiago | |
| 5,433,011 A | 7/1995 | Scarborough et al. | |
| 5,442,864 A | 8/1995 | Erman | |
| 5,617,641 A | 4/1997 | Aarhus | |
| 6,041,510 A | 3/2000 | Huff | |
| 6,279,240 B1 | 8/2001 | Bonaventura, Jr. | |
| 6,640,455 B1 * | 11/2003 | Smothers | ...................... 33/374 |
| 2002/0073565 A1 * | 6/2002 | Schooley | ...................... 33/374 |
| 2002/0116833 A1 | 8/2002 | Hollenbeck | |

FOREIGN PATENT DOCUMENTS

| | | |
|---|---|---|
| DE | 41 43 268 | 5/1992 |
| EP | 0 862 047 B1 | 11/1997 |
| WO | WO 2005/017452 | 2/2005 |

* cited by examiner

*Primary Examiner*—G. Bradley Bennett
(74) *Attorney, Agent, or Firm*—Harold Novick; The Nath Law Group

(57) ABSTRACT

An extension set for a spirit level having an elongated leveling face for setting on a surface and defining a nominal working length, an opposite face to the leveling face, a pair of opposite major side surfaces, and a pair of opposite end sections, the extension set including a pair of discrete elongated U-shaped profile spirit level extenders for lengthwise accommodating an end section of the spirit level with its leveling face facing towards the surface and its opposite face facing away therefrom on spaced apart alignment on the surface such that the pair of spirit level extenders partially underlie the spirit level's leveling face and their remaining portions extend lengthwise therebeyond for extending its nominal working length, and a pair of spirit level clamps for mounting on the pair of spirit level extenders for clamping the spirit level thereon.

8 Claims, 8 Drawing Sheets

EXTENSION SET FOR SPIRIT LEVELS

CROSS-REFERENCE TO RELATED APPLICATIONS

This application is a Continuation-In-Part of the International Application Serial Number PCT/IL2003/000685 filed in Israel in English on Aug. 18, 2003 and which designates the United States.

This application also claims the benefit of U.S. Provisional Application No. 60/750,069 filed Dec. 14, 2005.

FIELD OF THE INVENTION

The invention is in the field of spirit levels.

BACKGROUND OF THE INVENTION

Spirit level manufacturers typically offer different categories of spirit levels including inter alia high end contractor grade, low end DIY grade, and the like. There are no international standards defining the different categories of spirit levels but contractor grade spirit levels typically have thicker profiles with larger external dimensions than their DIY grade counterparts, thereby affording greater strength and accuracy. For example, Kapro Industries Ltd, Kibbutz Kadarim, Israel (www.kapro.com), the Assignee of the present invention manufactures a range of spirit levels including inter alia contractor grade Model No. 981 spirit levels with a 25 mm wide 60 mm high box section profile and DIY grade Model No. 781 Light spirit levels with a 20 mm wide 50 mm high box section profile. The former has an about 30% thicker profile than the latter.

Craftsmen typically possess only a single spirit level selected to be suitable for most of their needs but occasionally require a spirit level with a longer working length than the nominal working length of the spirit level in their possession. U.S. Pat. No. 3,648,378 to Thingstad et al., U.S. Pat. No. 4,130,943 to Talbot, U.S. Pat. No. 4,894,925 to Langmaid, U.S. Pat. No. 4,928,395 to Good, U.S. Pat. No. 5,249,365 to Santiago, U.S. Pat. No. 5,433,011 to Scarborough et al, U.S. Pat. No. 5,442,864 to Erman, U.S. Pat. No. 5,617,641 to Aarhus, U.S. Pat. No. 6,041,510 to Huff, U.S. Pat. No. 6,279,240 to Bonaventura, Jr., DE 41 43 268 to Schmidt, and U.S. Patent Application Publication No. US2002/20116833 to Hollenbeck illustrate and describe extension means for selectively extending nominal working lengths of spirit levels.

SUMMARY OF THE INVENTION

The present invention is for an extension set for spirit levels including a pair of discrete elongated U-shaped profile spirit level extenders, and a pair of spirit level clamps for selectively and conveniently securing the spirit level extenders at opposite ends of a spirit level for extending its nominal working length. The spirit level clamps are designed to clamp a spirit level in a spirit level extender, and preferably include a lateral securing arrangement for precluding lateral movement of a spirit level in a spirit level extender. Extension sets in accordance with the present invention can be freely used in difficult working environments, for example, a carpenter's workshop, a building site, and the like, and are designed not to leave residual marks as may be left when using the extension set illustrated and described in US Patent Application Publication No. US2002/20116833. Extension sets in accordance with the present invention may be sold as accessories suitable for use with existing box section spirit levels and I-beam spirit levels.

BRIEF DESCRIPTION OF THE DRAWINGS

In order to understand the invention and to see how it can be carried out in practice, preferred embodiments will now be described, by way of non-limiting examples only, with reference to the accompanying drawings in which similar parts are likewise numbered, and in which.

DESCRIPTION OF PREFERRED EMBODIMENTS OF THE PRESENT INVENTION

Figure 1:
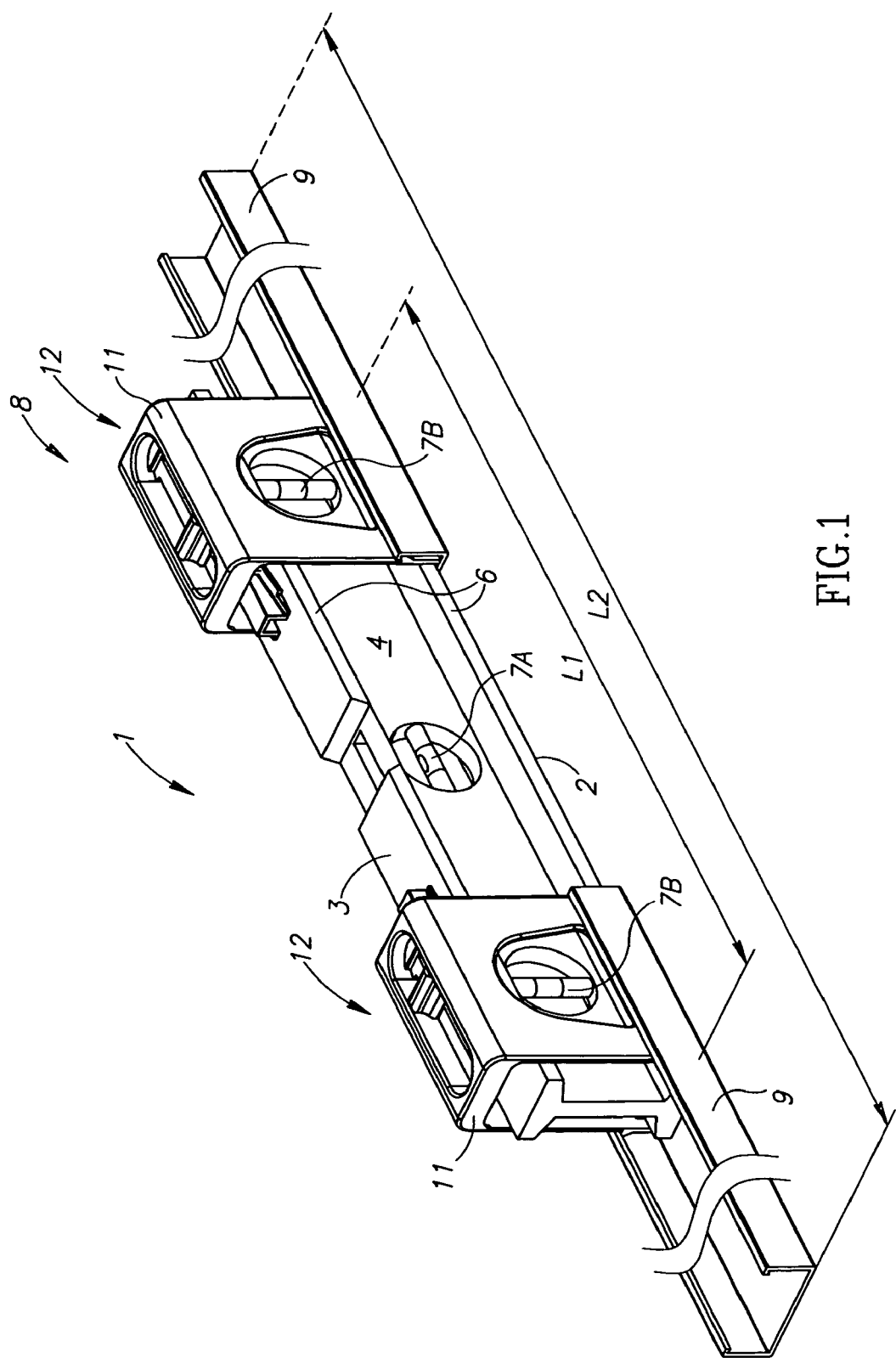
FIG. 1 is a perspective view showing the use of an extension set including a first embodiment of spirit level clamp for extending the nominal working length of an I-beam spirit level.
Figure 5:
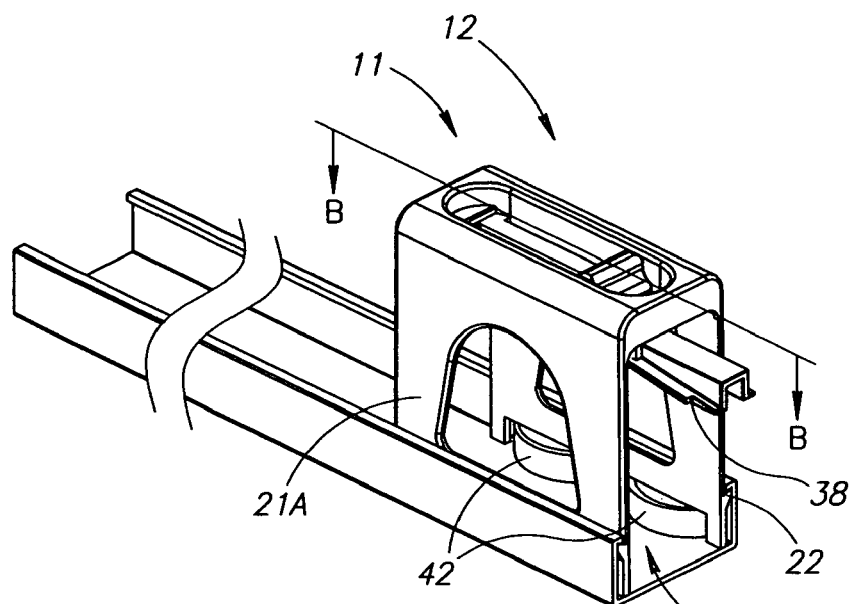
FIG. 5 is a right perspective view of the first embodiment of a spirit level clamp in a securing state mounted on a spirit level extender.
Figure 7:
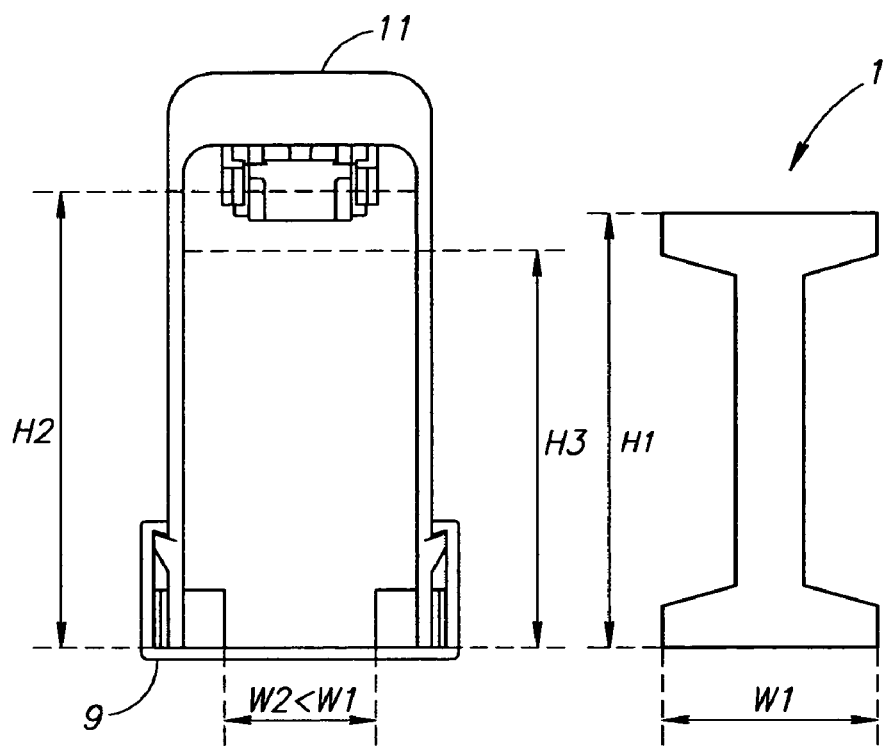
FIG. 7 is an end view of the first embodiment of a spirit level clamp mounted on a spirit level extender adjacent an I-beam spirit level.

FIG. 1 shows an I-beam section spirit level 1 having an elongated leveling face 2 for setting on a surface, an opposite face 3 to the leveling face 2, and a pair of major opposite surfaces 4 including extreme lowermost and uppermost side surfaces 6. The spirit level 1 has a nominal standard working length L1 defined by the leveling face 2 of, say, 24" in the case of an imperial size spirit level or, say, 60 cm in the case of a metric size spirit level, a width W1 and a height H1 (see FIG. 7). The spirit level 1 has three bubble vials 7 deployed along its length including a central bubble vial 7A with its longitudinal axis co-directional therewith, and lateral bubble vials 7B with their longitudinal axes perpendicular to the spirit level's longitudinal axis. One of the lateral bubble vials 7B is formed with the so-called Plumbsite® vial viewer illustrated and described in commonly assigned U.S. Pat. No. 6,748,666 to Zugel et al. The leveling face 2 may be flat or formed with a longitudinal groove for placing on a pipe, a post, and the like. The spirit level 1 is extendible to a working length L2>L1 by an extension set 8 including a pair of discrete elongated U-shaped profile spirit level extenders 9 with integrally formed inverted U-shaped spirit level clamps 11 for selectively and conveniently clamping the spirit level 1 on the spirit level extenders 9 such that they partially underlie the spirit level's leveling face 2 and their remaining portions extend lengthwise therebeyond. The spirit level clamps 11 include a vertical securing arrangement 12 for bearing on a spirit level's opposite face 3 and a lateral securing arrangement 13 for centering the spirit level 1 in a spirit level extender 9 (see FIGS. 2 and 5).

Figure 2:
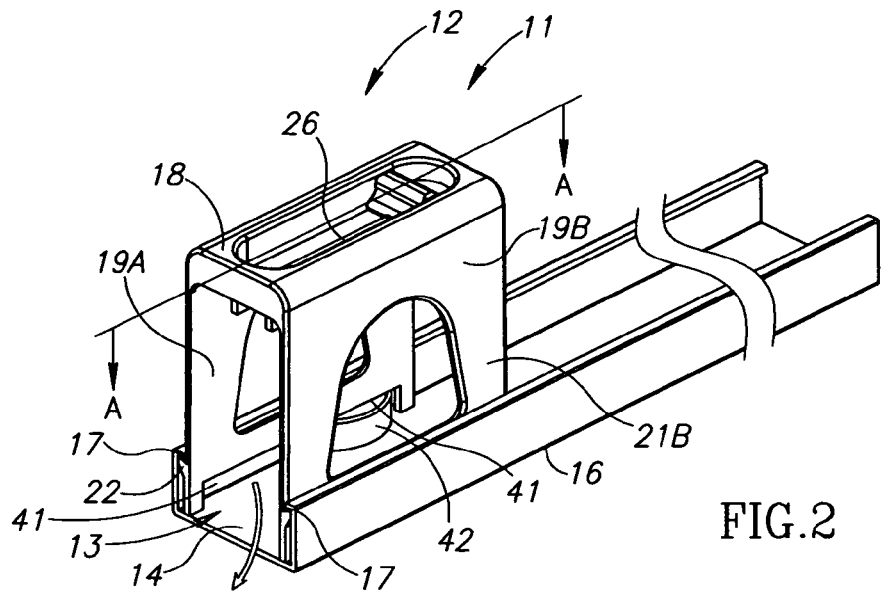
FIG. 2 is a left perspective view of the first embodiment of a spirit level clamp in a non-securing state mounted on a spirit level extender.

The spirit level extenders 9 are preferably formed from extruded aluminum, and include a top surface 14 on which a spirit level's leveling face 2 is intended to be placed, and a bottom surface 16 to be placed on a surface whose inclination is to be determined (see FIG. 2). Top surface 14 and bottom surface 16 are flat to about 0.001" accuracy so as not to degrade a spirit level's leveling accuracy. Spirit level extenders 9 can be provided in different lengths in the order of say, 12"±4" or the metric equivalent. Spirit level extenders 9 have a pair of opposite inwardly directed longitudinal female dovetail flanges 17 for engaging a spirit level clamp 11 (see FIG. 2).

The spirit level clamps 11 are preferably formed from rigid plastic material such as glass fiber reinforced polyamide, nylon, ABS, and the like. Each spirit level clamp 11 includes a top surface 18 connecting a pair of opposite major side walls 19A and 19B whose exterior surfaces 21A and 21B are each formed with a male dovetail ridge 22 for sliding insertion into a female dovetail flange 17 (see FIG. 2). The major side walls 19A and 19B are formed with trapezoidal shaped apertures 23A and 23B to avoid the spirit level clamps 11 obstructing the view of the bubble vials 7B when mounted on a spirit level 1 (see FIG. 1).

Figure 3:
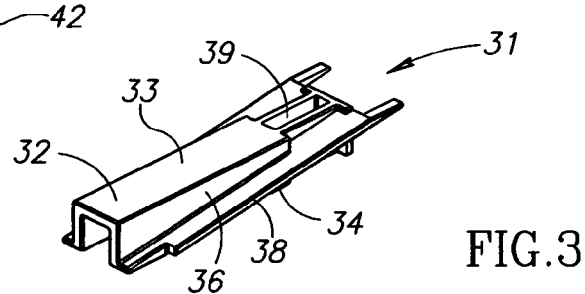
FIG. 3 is a perspective view of a vertical securing member of the first embodiment of a spirit level clamp.
Figure 4:
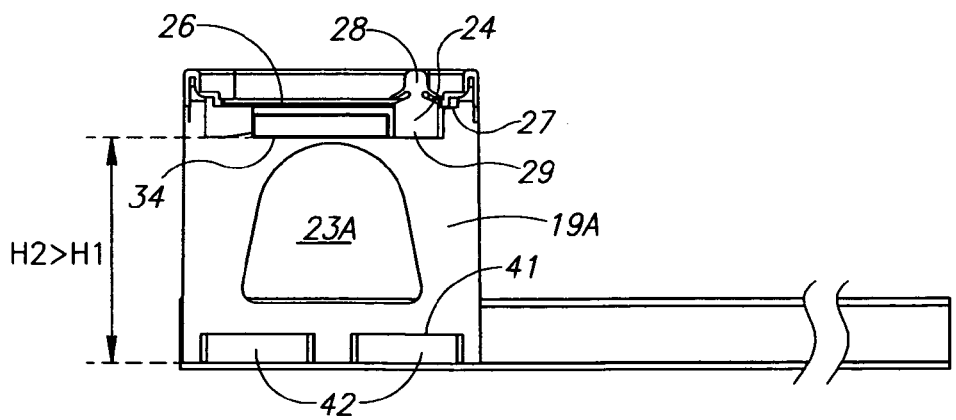
FIG. 4 is a longitudinal cross section of the spirit level clamp in FIG. 2 along line A-A therein.
Figure 6:
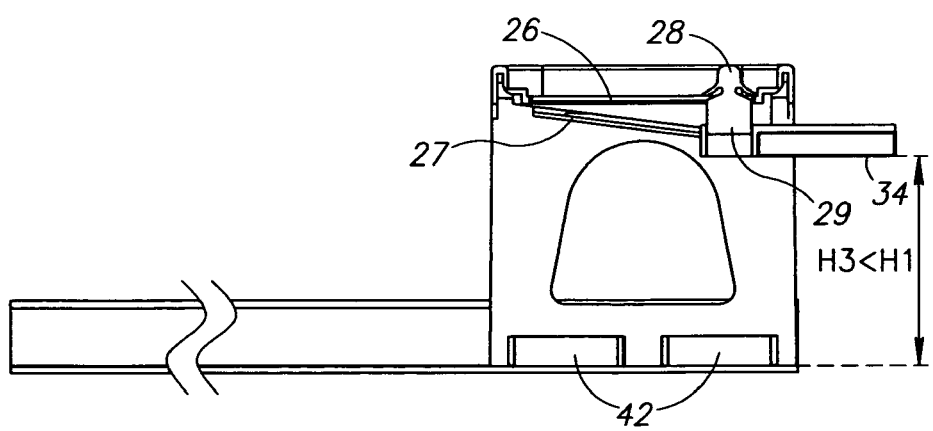
FIG. 6 is a longitudinal cross section of the spirit level clamp in FIG. 5 along line B-B therein.

Each vertical securing arrangement 12 includes a drive member 24 manually reciprocal along a slot 26 in the top surface 18 having a downward depending pair of parallel and opposite lengthwise directed inclined rails 27. The drive member 24 includes a handle member 28 disposed widthwise above the slot 26 for gripping by a user and a downward depending lengthwise directed key 29. The drive member 24 drives a vertical securing member 31 having a body 32 with a top surface 33, a bottom surface 34 for bearing against a spirit level's opposite face 3, a pair of parallel and opposite major side surfaces 36 with outwardly directed flanges 38 for sliding along the pair of parallel and opposite lengthwise directed inclined rails 27, and a throughgoing slot 39 (see FIG. 3). The key 29 is slidingly received in the slot 39 for sliding the vertical securing member 31 between a non-securing state in which the bottom surface 34 defines a height H2 with the top surface 14 where H2>H1 (see FIGS. 2 and 4) and a securing state in which the bottom surface 34 defines a height H3 with a top surface 14 where H3<H1 (see FIGS. 5 and 6). The key 29 is fully inserted in the slot 39 in the non-securing position and only partially inserted in the securing position. Spirit level clamps 11 are typically capable of being used with spirit levels over, say, a 10 mm height range by virtue of their vertical securing arrangements 12.

Each lateral securing arrangement 13 includes a pair of lengthwise directed cutouts 41 formed in the major side walls 19A and 19B for receiving elongated curved lateral securing members 42. The lateral securing members 42 are typically formed from suitable pliable plastic material, such as, acetal POM, and the like. The lateral securing members 42 have an end 42A for fixedly retaining in the spirit level clamp 11 and a free end 42B. The ends 42A of adjacent lateral securing members 42 are adjacent to one another and free ends 42B are remote from one another. The lateral securing members 42 bulge toward one another on being fitted into cutouts 41 to define a separation W2<W1 (see FIG. 7). The separation W2 is smaller than a spirit level's width W1 such that a moderate force is required to slide a spirit level 1 into a spirit level extender 9 by outwardly urging the lateral securing members 42 towards the major side walls 19A and 19B thereby further distancing the free ends 42B. However, the separation W2 is not much smaller than a spirit level's width W1 since this would prevent the lengthwise sliding insertion of a spirit level 1 into a spirit level extender 9. Lateral securing arrangements 13 are preferably capable of being used with spirit levels over, say, a 5 mm width range, for taking advantage of the inherent elasticity of their lateral securing members 42 for centering a spirit level 1 therein on its lengthwise sliding insertion into a spirit level extender 9.

Figure 8:
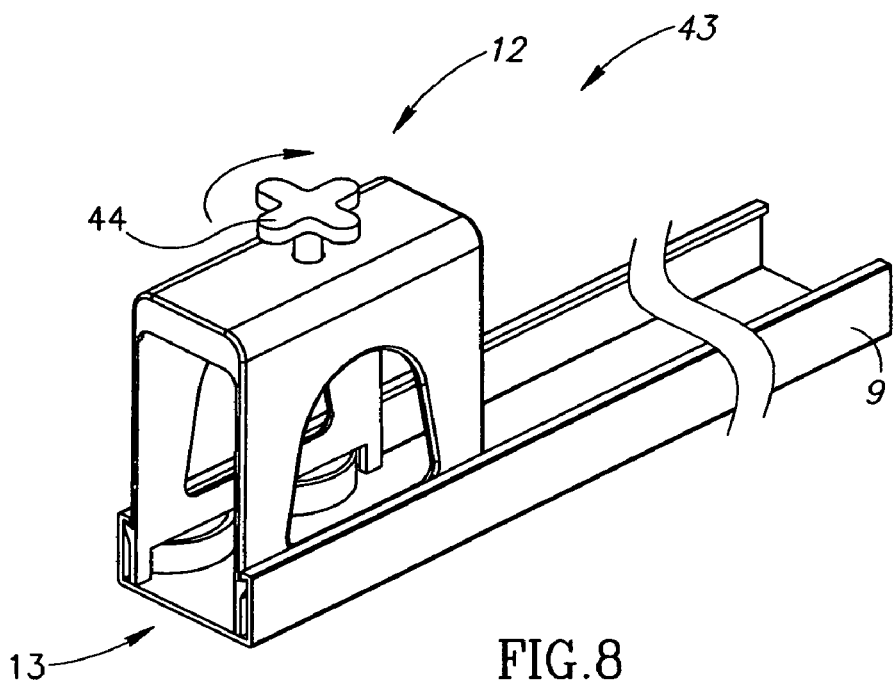
FIG. 8 is a perspective view of a second embodiment of a spirit level clamp mounted on a spirit level extender.

FIG. 8 shows a spirit level clamp 43 with a vertical securing arrangement 12 and a lateral securing arrangement 13. The vertical securing arrangement 12 includes a vertical securing member 44 for screw threading down onto a spirit level's opposite face 3 for securing a spirit level in a spirit level extender 9.

Figure 9:
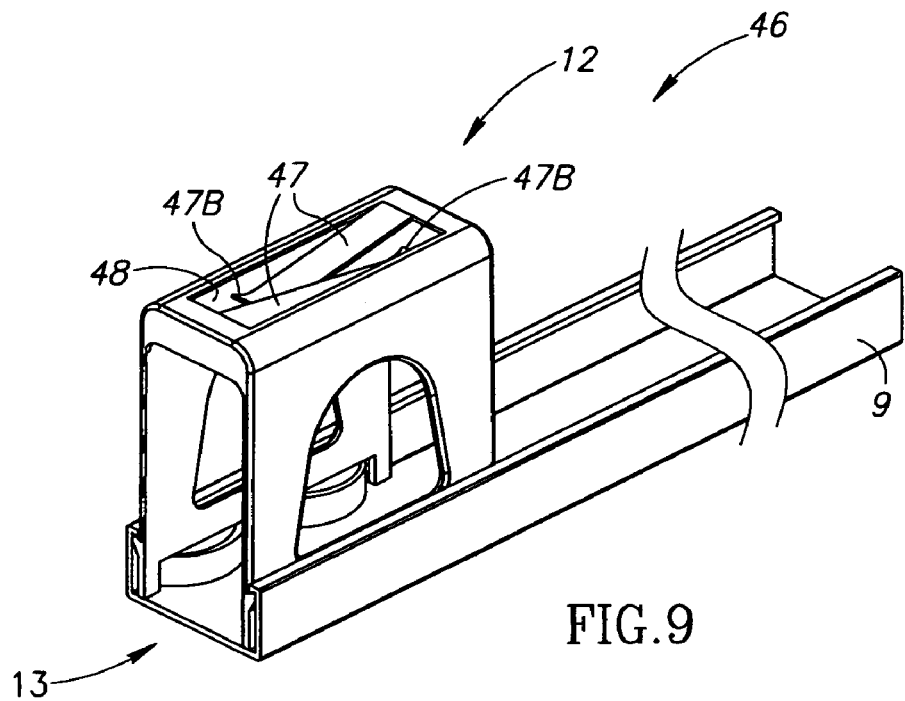
FIG. 9 is a perspective view of a third embodiment of a spirit level clamp mounted on a spirit level extender.
Figure 10:
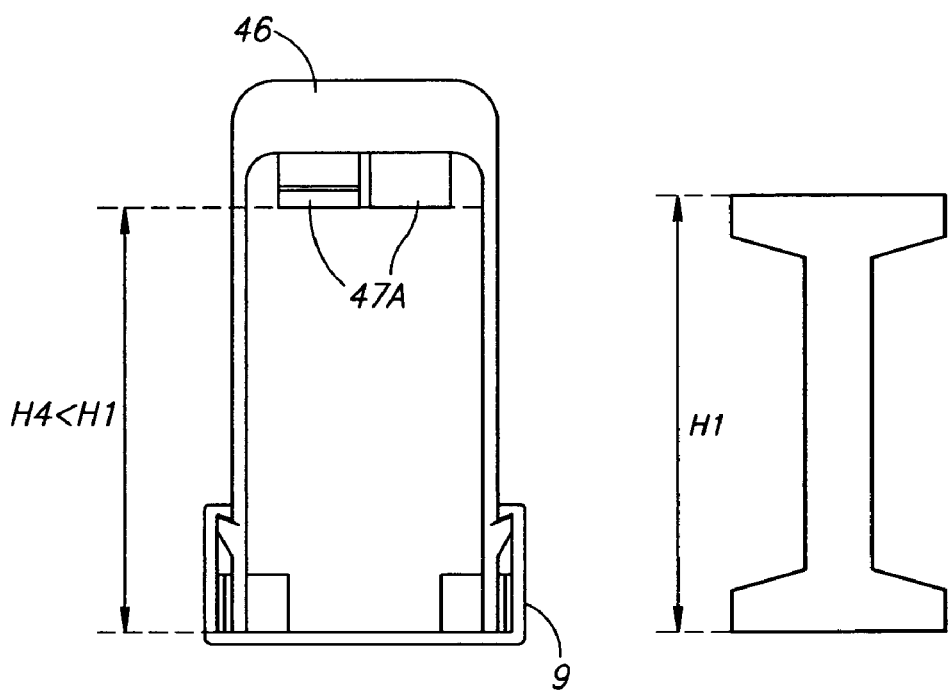
FIG. 10 is an end view of the third embodiment of a spirit level clamp mounted on a spirit level extender adjacent an I-beam spirit level.
Figure 11:
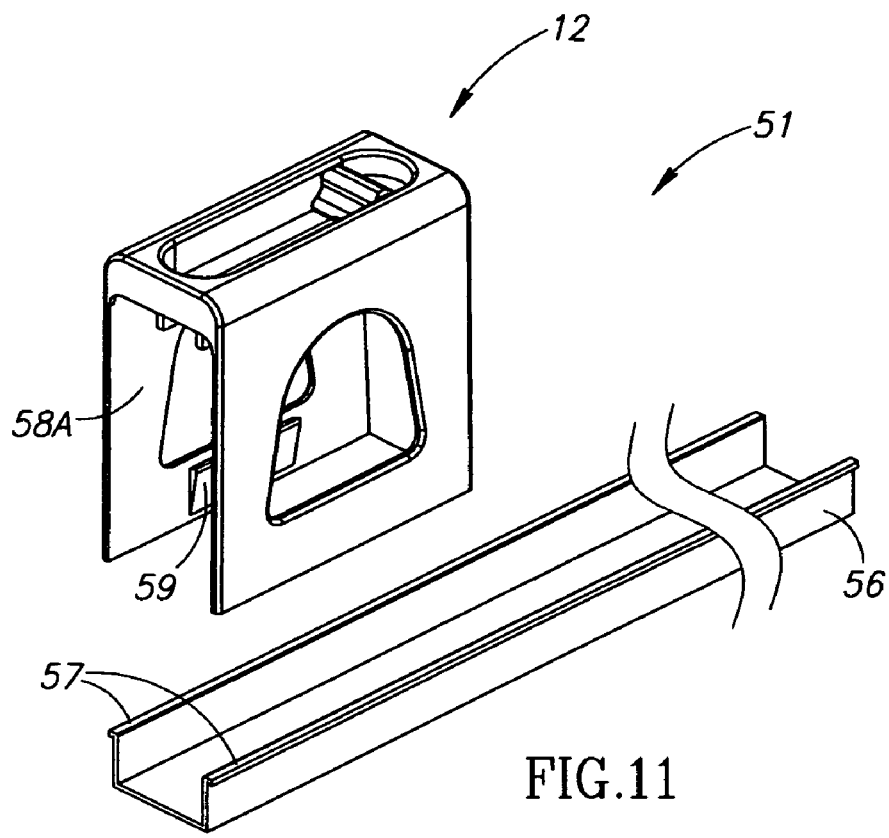
FIG. 11 is a perspective view of a fourth embodiment of a spirit level clamp for mounting on a spirit level extender.
Figure 12:
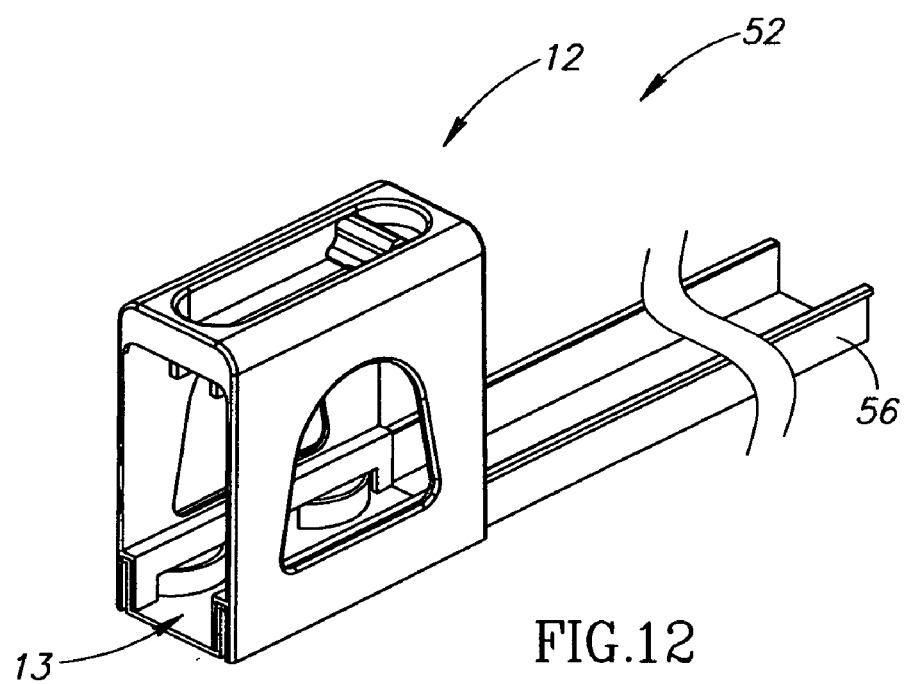
FIG. 12 is a perspective view of a fifth embodiment of a spirit level clamp mounted on a spirit level extender.
Figure 13:
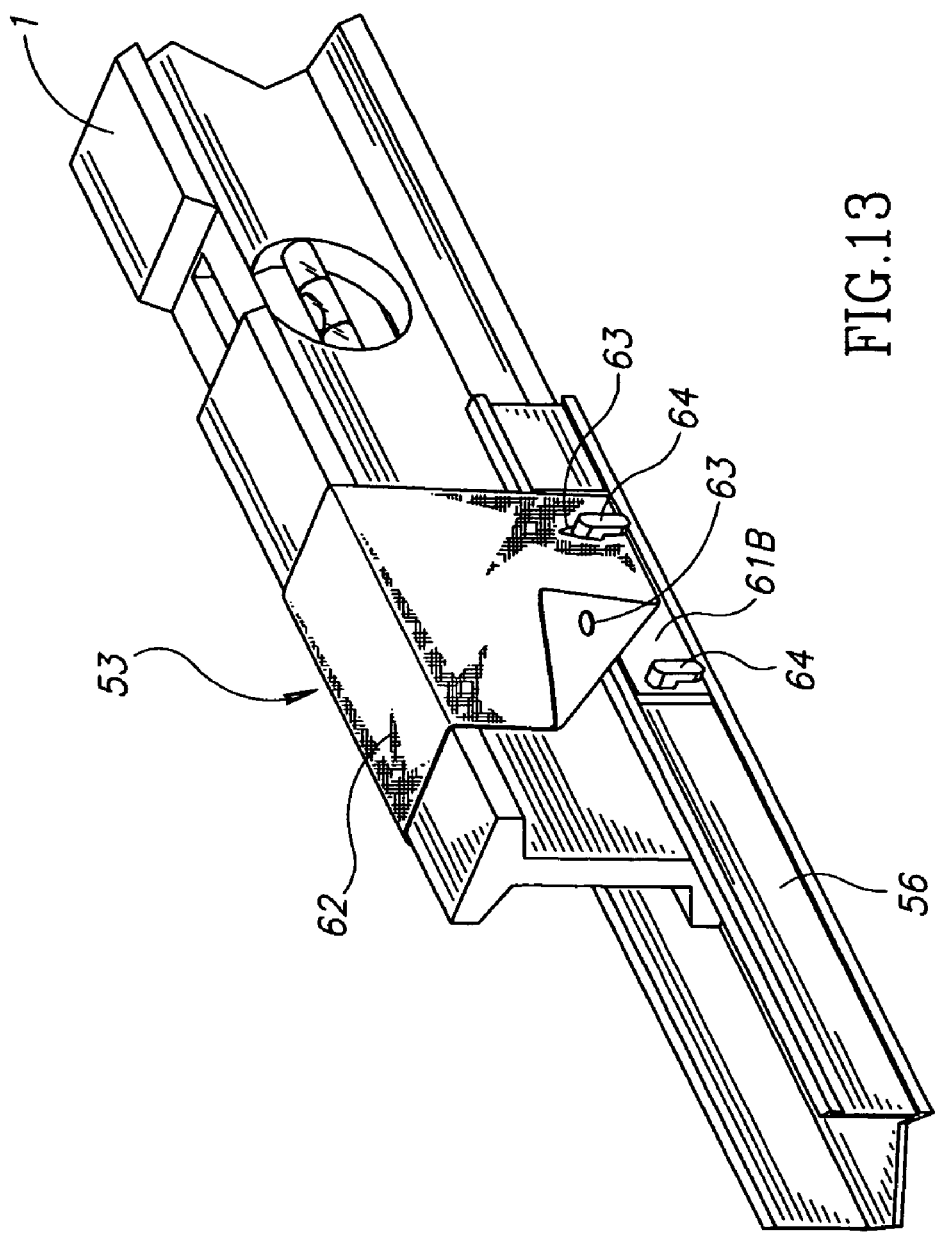
FIG. 13 is a perspective view of a sixth embodiment of a spirit level clamp mounted on a spirit level extender.
Figure 14:
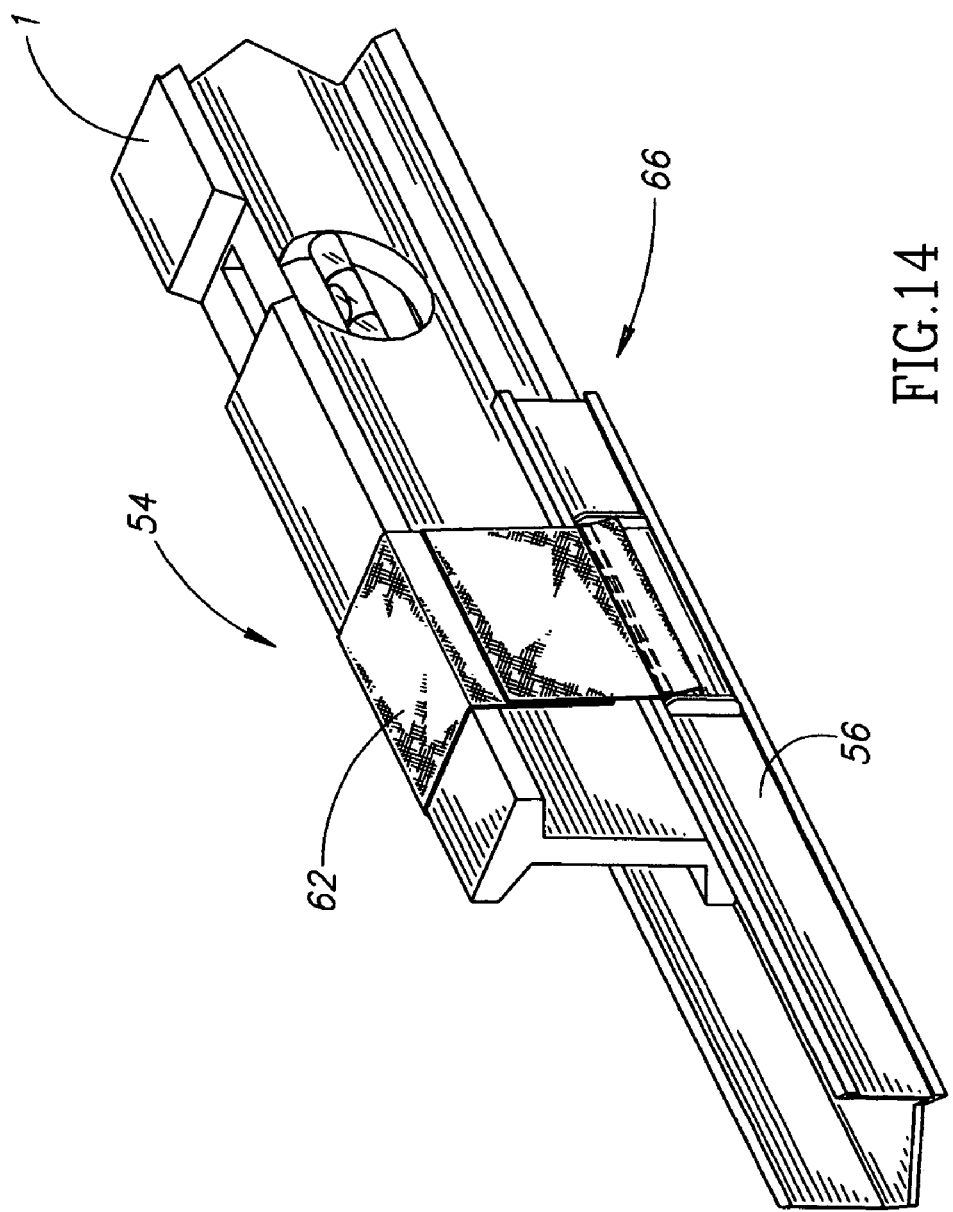
FIG. 14 is a perspective view of a seventh embodiment of a spirit level clamp mounted on a spirit level extender.

FIG. 9 shows a spirit level clamp 46 with a vertical securing arrangement 12 and a lateral securing arrangement 13. The vertical securing arrangement 12 includes a pair of oppositely directed cantilevered clamping members 47 extending lengthwise in a slot 48 formed in the top surface 18. The vertical securing members 47 are resiliently hinged and have lowermost apexes 47A towards their free ends 47B. The vertical securing members' apexes 47A have a natural height H4 purposely designed such that a spirit level's height H1>H4 by, say, 0.2" (see FIG. 10). A spirit level's opposite face 3 bears against the clamping members' apexes 47A on the sliding insertion of the spirit level 1 along a spirit level extender 9 to urge the resiliently hinged vertical securing members 47 outward whereupon they apply a downward counter pressure thereon for securing the spirit level 1 therein FIGS. 11-14 show spirit level clamps 51, 52, 53 and 54 for mounting on the outside of a discrete elongated U-shaped profile spirit level extender 56 having a pair of opposite outwardly directed longitudinally directed female dovetail flanges 57. The spirit level clamps 51, 52, 53 and 54 have opposite major side walls 19A and 19B with interior surfaces 58A and 58B each formed with a male dovetail insert 59 for sliding insertion into a female dovetail flange 57. The spirit level clamps 51, 52, 53 and 54 may or may not include a lateral securing arrangement 13. The spirit level clamp 51 includes the same vertical securing arrangement 12 as the spirit level clamp 11. The spirit level clamp 52 includes the same vertical securing arrangement 12 and the same lateral securing arrangement 13 as the spirit level clamp 11.

The spirit level clamp 53 includes a pairs of runners 61A (not shown) and 61B for sliding insertion into the female dovetail flanges 57, and an elastic strap 62 fixedly mounted on the runner 61A and formed with a pair of eyes 63 for hooking onto a pair of hooks 64 provided on the runner 61B for tensioning the elastic strap 62 over a spirit level 1 for securing it in a spirit level extender 56. Alternatively, the hooks 64 may be discrete items. Alternatively, the hook-eye arrangement can be replaced by a complementary male female Velcro® arrangement 66 (see FIG. 14).

While the invention has been described with respect to a limited number of embodiments, it will be appreciated that many variations, modifications, and other applications of the invention can be made within the scope of the appended claims.

The invention claimed is:

1. An extension set for a spirit level having an elongated leveling face for setting on a surface and defining a nominal working length, an opposite face to the leveling face, a pair of opposite major side surfaces, and a pair of opposite end sections, the extension set comprising:
   (a) a pair of discrete elongated U-shaped profile spirit level extenders for lengthwise accommodating an end section of the spirit level with its leveling face facing towards the surface and its opposite face facing away therefrom on spaced apart alignment on the surface such that said pair of spirit level extenders partially underlie the spirit level's leveling face and their remaining portions extending lengthwise therebeyond for extending its nominal working length; and
   (b) a pair of spirit level clamps for mounting on said pair of spirit level extenders for clamping the spirit level thereon.

2. The extension set according to claim 1 wherein each spirit level clamp includes a lateral securing arrangement for positively bearing against at least one of a spirit level's pair of opposite major side surfaces for precluding lateral movement of a spirit level in a spirit level extender.

3. The extension set according to claim 2 wherein a lateral securing arrangement includes at least one resiliently elastically deformable member disposed lengthwise for bearing against a spirit level's major side surface.

4. The extension set according to claim 3 wherein a lateral securing arrangement includes at least one pair of opposite resiliently elastically deformable members disposed lengthwise for bearing against a spirit level's opposite major side surfaces for centering a spirit level in a spirit level extender.

5. The extension set according to claim 1 wherein a spirit level clamp includes a vertical securing member for manual reciprocation along a pair of parallel and opposite inclined rails between a non-securing state enabling free lengthwise sliding insertion of a spirit level into a spirit level clamp mounted on a spirit level extender and a securing state for bearing on a spirit level's opposite face for clamping a spirit level in a spirit level extender.

6. The extension set according to claim 1 wherein a spirit level clamp includes a vertical securing member for screw threading toward a spirit level's opposite face for bearing thereon for clamping a spirit level in a spirit level extender.

7. The extension set according to claim 1 wherein a spirit level clamp includes at least one resiliently hinged clamping member for bearing on a spirit level's opposite face for clamping a spirit level in a spirit level extender.

8. The extension set according to claim 1 wherein a spirit level clamp includes an elastic strap for bearing on a spirit level's opposite face on being tensioned across a spirit level placed in a spirit level extender for clamping a spirit level in a spirit level extender.

* * * * *